(12) United States Patent
Soltani et al.

(10) Patent No.: US 12,185,254 B2
(45) Date of Patent: Dec. 31, 2024

(54) CONFIGURABLE POWER AMPLIFIER BACKOFF

(71) Applicant: QUALCOMM Incorporated, San Diego, CA (US)

(72) Inventors: Morteza Soltani, San Diego, CA (US); Jun Ma, San Diego, CA (US); Anantha Krishna Karthik Nagarajan, San Diego, CA (US); Iyab Issam Sakhnini, San Diego, CA (US); Wooseok Nam, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/232,806

(22) Filed: Apr. 16, 2021

(65) Prior Publication Data

US 2022/0338126 A1      Oct. 20, 2022

(51) Int. Cl.
*H04W 52/14* (2009.01)
*H04W 52/36* (2009.01)
*H04W 52/52* (2009.01)

(52) U.S. Cl.
CPC ....... *H04W 52/146* (2013.01); *H04W 52/365* (2013.01); *H04W 52/52* (2013.01)

(58) Field of Classification Search
CPC . H04W 52/146; H04W 52/365; H04W 52/52; H04W 52/34; H04W 52/36
See application file for complete search history.

(56) References Cited

U.S. PATENT DOCUMENTS

| | | | |
|---|---|---|---|
| 10,440,665 B1 * | 10/2019 | Witherell | H04W 52/367 |
| 2008/0096574 A1 * | 4/2008 | Khandekar | H04W 52/265 455/452.2 |
| 2008/0130589 A1 * | 6/2008 | Gorokhov | H04W 52/30 370/336 |
| 2009/0052426 A1 * | 2/2009 | Perraud | H04W 52/146 370/338 |
| 2013/0142154 A1 * | 6/2013 | Gorokhov | H04W 52/04 370/329 |

FOREIGN PATENT DOCUMENTS

WO    WO-2013087508 A1 *   6/2013   .......... H04W 52/262

* cited by examiner

*Primary Examiner* — John J Lee
(74) *Attorney, Agent, or Firm* — Harrity & Harrity, LLP

(57) ABSTRACT

Various aspects of the present disclosure generally relate to wireless communication. In some aspects, a mobile station may receive information relating to a power amplifier backoff adjustment. The mobile station may transmit an uplink communication on a frequency channel using an adjusted power amplifier backoff determined based at least in part on the information. Numerous other aspects are described.

30 Claims, 8 Drawing Sheets

CONFIGURABLE POWER AMPLIFIER BACKOFF

FIELD OF THE DISCLOSURE

Aspects of the present disclosure generally relate to wireless communication and to techniques and apparatuses for configurable power amplifier backoff for improved link performance.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a mobile station for wireless communication includes a memory, and one or more processors, coupled to the memory, configured to: receive information relating to a power amplifier backoff adjustment; and transmit an uplink communication on a frequency channel using an adjusted power amplifier backoff determined based at least in part on the information.

In some aspects, a base station for wireless communication includes a memory, and one or more processors, coupled to the memory, configured to: transmit, to a mobile station, information relating to a power amplifier backoff adjustment; and receive, from the mobile station, an uplink communication on a frequency channel using an adjusted power amplifier backoff determined based at least in part on the information.

In some aspects, a method of wireless communication performed by a mobile station includes receiving, by the mobile station, information relating to a power amplifier backoff adjustment; and transmitting, by the mobile station, an uplink communication on a frequency channel using an adjusted power amplifier backoff determined based at least in part on the information.

In some aspects, a method of wireless communication performed by a base station includes transmitting, by the base station and to a mobile station, information relating to a power amplifier backoff adjustment; and receiving, by the base station and from the mobile station, an uplink communication on a frequency channel using an adjusted power amplifier backoff determined based at least in part on the information.

In some aspects, a non-transitory computer-readable medium storing a set of instructions for wireless communication includes one or more instructions that, when executed by one or more processors of a mobile station, cause the mobile station to: receive information relating to a power amplifier backoff adjustment; and transmit an uplink communication on a frequency channel using an adjusted power amplifier backoff determined based at least in part on the information.

In some aspects, a non-transitory computer-readable medium storing a set of instructions for wireless communication includes one or more instructions that, when executed by one or more processors of a base station, cause the base station to: transmit, to a mobile station, information relating to a power amplifier backoff adjustment; and receive, from the mobile station, an uplink communication on a frequency channel using an adjusted power amplifier backoff determined based at least in part on the information.

In some aspects, an apparatus for wireless communication includes means for receiving information relating to a power amplifier backoff adjustment; and means for transmitting an uplink communication on a frequency channel using an adjusted power amplifier backoff determined based at least in part on the information.

In some aspects, an apparatus for wireless communication includes means for transmitting, to a mobile station, information relating to a power amplifier backoff adjustment; and means for receiving, from the mobile station, an uplink communication on a frequency channel using an adjusted power amplifier backoff determined based at least in part on the information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
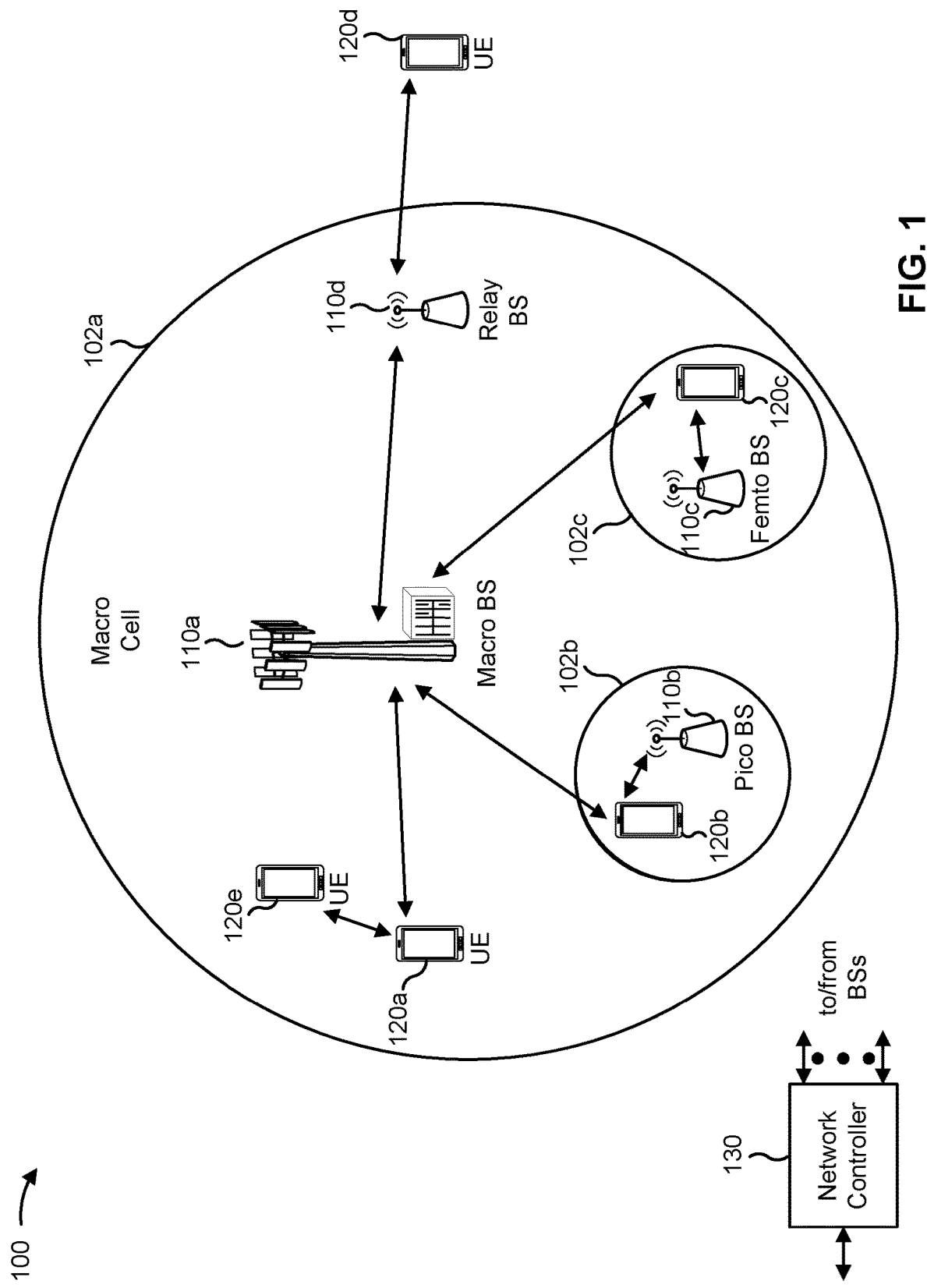
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
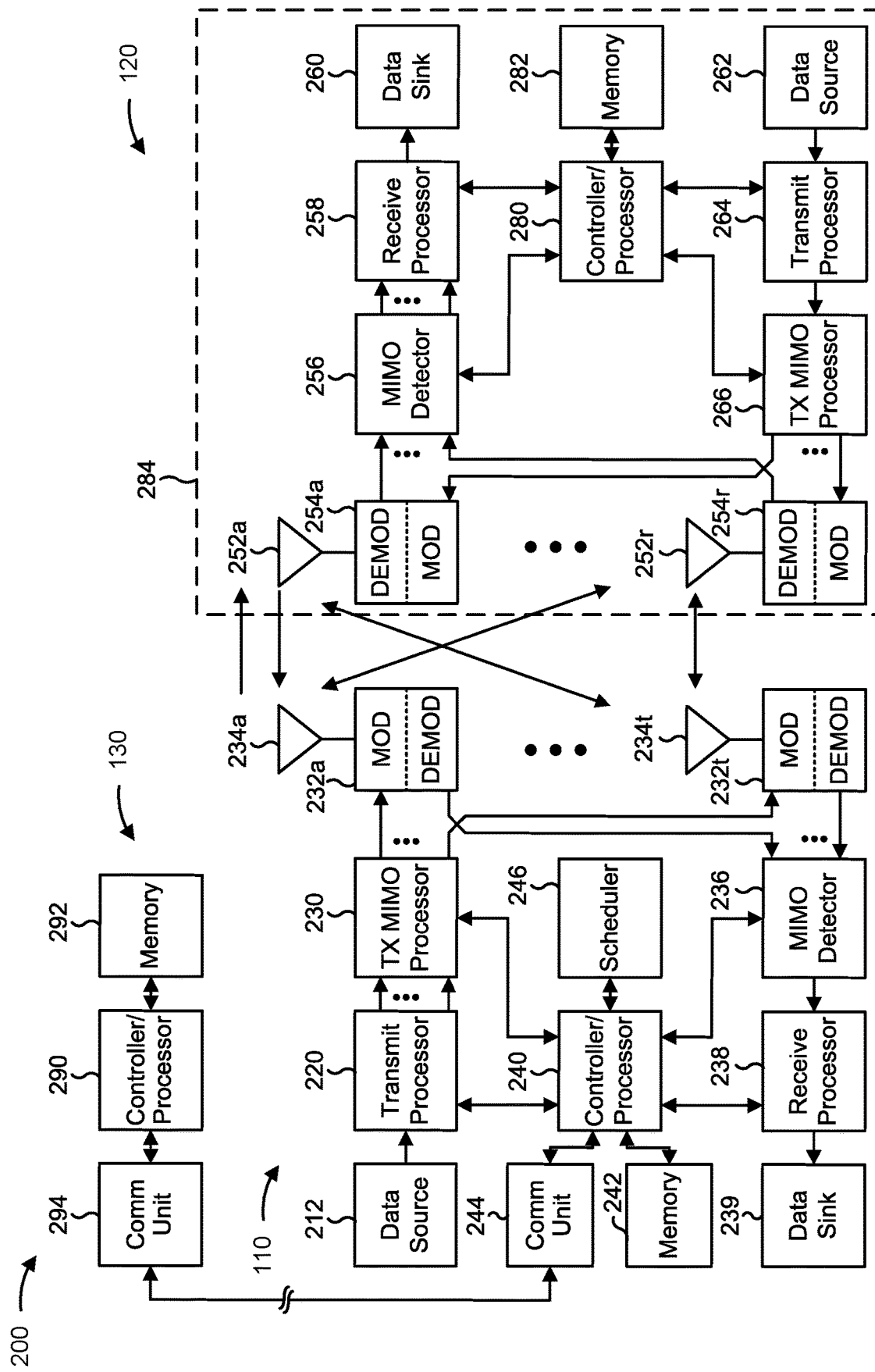
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., OFDM,) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. In some aspects, the base station 110 may include one or more power amplifiers that amplify a transmission power of the downlink signals.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. In some aspects, the transceiver may include one or more power amplifiers that increase a transmission power of signals transmitted by the UE 120. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with configurable power amplifier backoff for improved link performance, as described in more detail elsewhere herein. In some aspects, the mobile station described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the mobile station includes means for receiving, by the mobile station, information relating to a power amplifier backoff adjustment; and/or means for transmitting, by the mobile station, an uplink communication on a frequency channel using an adjusted power amplifier backoff determined based at least in part on the information. In some aspects, the means for the mobile station to perform operations described herein may include, for example, one or more components of UE 120 described in connection with FIG. 2, such as antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, by the base station and to a mobile station, information relating to a power amplifier backoff adjustment; and/or means for receiving, by the base station and from the mobile station, an uplink communication on a frequency channel using an adjusted power amplifier backoff determined based at least in part on the information. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
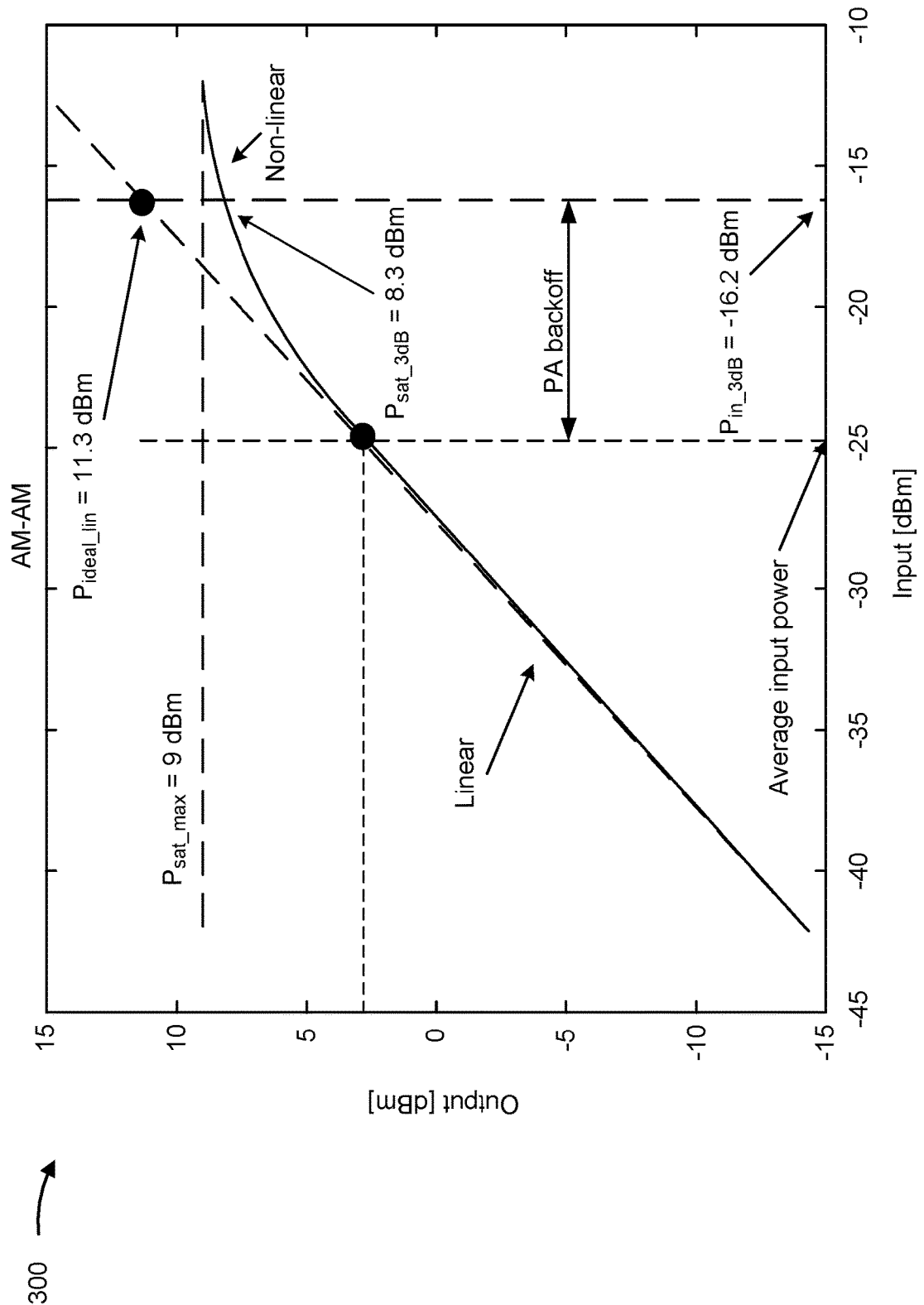
FIG. 3 is a diagram illustrating an example of power amplifier non-linear distortion, in accordance with the present disclosure.

FIG. 3 is a diagram illustrating an example 300 of power amplifier non-linear distortion, in accordance with the present disclosure. Example 300 shows an amplitude-to-amplitude modulation (AM-AM) characteristic of a power amplifier.

Power amplifiers are used in wireless network devices, such as UEs and base stations, to increase the power of signals to provide high-quality transmissions. However, power amplifiers may produce non-linear distortions due to a saturation property. As shown in FIG. 3, at lower input power levels, a power amplifier may operate in a linear region, in which there is a linear (or approximately linear) relationship between the input power level and an output power level of the power amplifier. At higher input power levels, as the power amplifier approaches a saturation point, the power amplifier may experience non-linear distortion and operate in a non-linear region, in which there is non-linear relationship between the input power level and the output power level. For example, in the non-linear region, as the input power level is increased, the output power level may approach a maximum saturation power level (e.g., $P_{sat\_max}=9$ decibel milliwatts (dBm) in example 300). The saturation point may correspond to a point at which a difference between an ideal linear output power level ($P_{ideal\_lin}$) and the actual output power level satisfies a threshold (e.g., 3 dBm). The ideal linear output power level ($P_{ideal\_lin}$) is a hypothetical output power level, for a particular input power level, that would result from an ideal case in which there is no non-linear distortion. As shown in example 300, a 3 dBm saturation point corresponds to an input power level ($P_{in\_3\ dB}=-16.2$ dBm) at which the difference between the ideal linear output power level ($P_{ideal\_lin}=11.3$ dBm) and the actual output power level ($P_{sat\_3\ dB}=8.3$ dBm) reaches 3 dBm.

Power amplifier non-linear distortion (e.g., resulting from operating at or near the saturation point) may cause interference both in the frequency band of a transmitted signal (e.g., in-band interference) and in adjacent/neighboring frequency channels/bands (e.g., out-of-band interference). The in-band interference caused by the power amplifier non-linear distortion may degrade the link performance (e.g., block error rate (BLER)), while the out-of-band interference may adversely affect communications between wireless network devices operating in the adjacent frequency channels. In some examples, in order to reduce interference with wireless communication devices operating in the adjacent channels, a spectrum emission mask, which imposes a power limit on the adjacent channels, may be applied.

In some examples, in order to reduce the effects of non-linear distortion on both in-band interference and out-of-band interference, a power amplifier backoff may be applied to control the power amplifier to operate in, or close to, the linear region. The power amplifier backoff is an amount by which the input power level of a power amplifier is reduced. For example, the power amplifier backoff may be subtracted from the input power level at the saturation point (e.g., $P_{in\_3\ dB}$), or the power amplifier backoff may be subtracted from an input power level having a maximum efficiency. The power amplifier backoff may be applied to reduce the input power level such that an average input power level of the power amplifier is in, or close to, the linear region. This may ensure that the power amplifier stays in, or close to, the linear region even if there is a slight increase or fluctuation in the input power level.

In some cases, a power amplifier backoff may result in a tradeoff between power efficiency and interference reduction. For example, a larger power amplifier backoff may reduce interference due to power amplifier non-linear distortion, but may also result in reduced power amplifier efficiency, which may potentially degrade the link performance for a transmission. A smaller power amplifier backoff may lead to an increased output power, and thus increased coverage, for a transmission. A smaller power amplifier backoff may also lead to better power amplifier efficiency, as compared to a larger power amplifier backoff, which may reduce power consumption and improve battery life for a wireless communication device (e.g., a UE). However, a smaller power amplifier backoff may increase signal distortion, which may decrease coverage for a transmission. Furthermore, as the power amplifier backoff for a power amplifier decreases, a power spectrum may increase in the adjacent frequency channels. Accordingly, a smaller power amplifier backoff may result in increased out-of-band interference and/or a violation of a spectrum emission mask regulation.

In some examples, an optimization process may be used to determine an optimal power amplifier backoff that balances power efficiency and link performance. The optimal power amplifier backoff may vary based at least in part on MCS (e.g., quadrature phase shift keying (QPSK) or quadrature amplitude modulation (QAM), among other examples), waveform type (e.g., OFDM, DFT-s-OFDM, or single carrier QAM (SC-QAM), among other examples), and/or an input power level of the power amplifier before applying the power amplifier backoff, among other examples. For example, simulations of transmissions (e.g., using an additive white Gaussian noise (AWGN) channel model and/or a cluster delay line (CDL) channel model, among other examples), with various power amplifier backoff levels, using various MCSs and waveforms show different optimal power amplifier backoffs (e.g., that results in a lowest BLER) for different simulated MCS and waveform combinations.

As indicated above, FIG. 3 is provided as an example. Other examples may differ from what is described with respect to FIG. 3.

In wireless communications networks, such as 5G-NR and/or 4G-LTE, spectrum emission masks may be applied to regulate out-of-band emissions. In such cases, the spectrum emission mask may be fixed and may always be enforced over a specific frequency band. Such spectrum emission mask requirements may lead to application of sub-optimal power amplifier backoffs, such as power amplifier backoffs that reduce power amplifier efficiency and degrade link performance. In some cases, the application of the spectrum emission mask may not always be necessary, such as in a case in which there is no on-going communication in the adjacent frequency channels/bands to the carrier channel. However, there is no mechanism by which a UE may utilize a different power amplifier backoff that improves the link performance for a transmission in such a case in which the spectrum emission mask is not necessary. This may result in reduced link performance, reduced coverage, and reduced power efficiency (leading to increased power consumption and decreased battery life) for the UE.

Some techniques and apparatuses described herein enable a configurable power amplifier backoff for improved link performance. In some aspects, a base station may transmit, to a UE (e.g., a mobile station), information relating to a power amplifier backoff adjustment. The UE may receive the information relating to the power amplifier backoff adjustment, and the UE may transmit an uplink communication on a frequency channel using an adjusted power amplifier backoff determined based at least in part on the information. In some aspects, the information may relate to spectrum usage on neighboring channels to the frequency channel, and the UE may transmit the uplink communication using the adjusted power amplifier backoff based at least in part on a determination that the spectrum usage on the neighboring channels does not satisfy a threshold. As a result, the UE may adjust a power amplifier backoff for an uplink transmission to improve link performance for the uplink transmission. This may result in improved link performance, increased coverage, and increased power efficiency (leading to decreased power consumption and increased battery life) for the UE.

Figure 4:
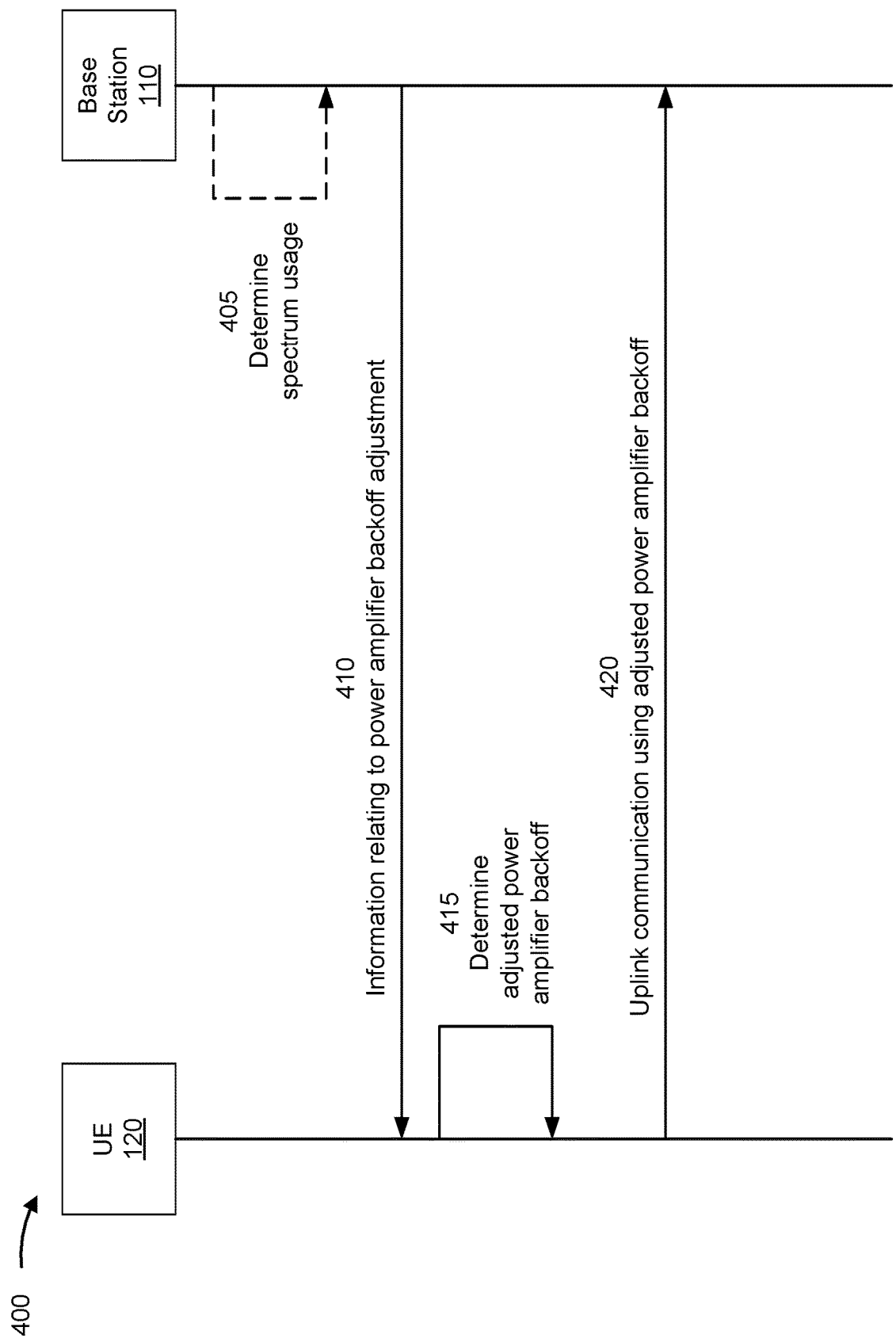
FIG. 4 is a diagram illustrating an example associated with configurable power amplifier backoff for improved link performance, in accordance with the present disclosure.

FIG. 4 is a diagram illustrating an example 400 associated with configurable power amplifier backoff for improved link performance, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink. The UE 120 may also be referred to as a "mobile station."

As shown in FIG. 4, and by reference number 405, the base station 110 may determine spectrum usage on one or more neighboring frequency channels to a frequency channel used for communications between the base station 110 and the UE 120. The frequency channel used for communications between the base station 110 and the UE 120 may be referred to herein as the "carrier channel" The neighboring frequency channels may be adjacent frequency channels or bands to the carrier channel and/or frequency channels or bands within a certain range of frequencies of the carrier channel. In some aspects, the UE 120 and the base station 110 may communicate in a high-frequency operating band, such as an FR4 operating band (e.g., 52.6 GHz to 71 GHz) or an FR5 operating band (e.g., 95 GHz to 325 GHz).

In some aspects, the base station 110 may receive scheduling information from one or more other base stations. For example, the base station 110 and the one or more other base stations may share scheduling information through a high-speed backhaul connection. The base station 110 may determine and/or monitor the spectrum usage on the neighboring frequency channels based at least in part on the scheduling information.

In some aspects, the base station 110 may determine a power amplifier backoff value for one or more downlink communications based at least in part on the spectrum usage. In some aspects, the base station 110 may determine whether to transmit a downlink communication using a default power amplifier backoff or an adjusted power amplifier backoff based at least in part on the spectrum usage. For example, the default power amplifier backoff may be a power amplifier backoff that results in downlink communications that satisfy a spectrum emission mask. In some aspects, the adjusted power amplifier backoff may be a power amplifier backoff that results in a downlink communication having an improved link performance (e.g., an improved BLER), as compared to a downlink communication transmitted using the default power amplifier backoff. In some aspects, the base station 110 may determine to use the adjusted power amplifier backoff based at least in part on determining that the spectrum usage on the neighboring frequency channels does not satisfy a threshold. In this case, the base station 110 may use the adjusted power amplifier backoff even if the adjusted power amplifier backoff results in a downlink communication that does not satisfy the spectrum emission mask.

In some aspects, base station 110 may select the adjusted power amplifier backoff based at least in part on an MCS for the downlink communication, a waveform for the downlink communication, and/or an input power level (before applying the adjusted power amplifier backoff) for the downlink communication. For example, the adjusted power amplifier may be an optimal power amplifier backoff determined for the MCS, waveform, and input power level for the downlink communication.

In some aspects, the base station 110 may determine to transmit the downlink communication using the adjusted power amplifier backoff based at least in part on a traffic type associated with the downlink communication. For example, the UE 120 may use the adjusted power amplifier backoff (even if resulting downlink communication may not satisfy the spectrum emission mask) in a case in which the downlink communication includes ultra-reliable low-latency communication (URLLC) traffic.

As further shown in FIG. 4, and by reference number 410, the base station 110 may transmit, to the UE 120, information relating to a power amplifier backoff adjustment. The UE 120 may receive the information relating to the power amplifier backoff adjustment. For example, the information may relate to a determination of whether the UE 120 is to use an adjusted power amplifier backoff for an uplink communication.

In some aspects, the information, transmitted from the base station 110 to the UE 120, may include spectrum usage information that indicates spectrum usage on the neighboring frequency channels for the carrier channel. For example, the base station 110 may transmit the spectrum usage information to the UE 120 in at least one of downlink control information (DCI), a medium access control (MAC) control element (MAC-CE), or a radio resource control (RRC) message. In some aspects, the base station 110 may transmit the spectrum usage information using layer 1 (L1) signaling (e.g., DCI), layer 2 (L2) signaling (e.g., MAC-CE), or layer 3 (L3) signaling (e.g., RRC) based at least in part on dynamics of the spectrum usage. For example, the base station 110 may transmit the spectrum usage information in DCI carried in a physical downlink control channel (PDCCH) communication based at least in part on a determination that the spectrum usage variation is fast (e.g., the spectrum usage variation satisfies a threshold). In some aspects, the spectrum usage information may include an indication of whether or not there is any spectrum usage on the neighboring frequency channels. In some aspects, the spectrum usage information may indicate a level of spectrum usage on the neighboring frequency channels.

In some aspects, the information, transmitted by the base station 110 to the UE 120, may indicate a power amplifier backoff adjustment value. For example, the base station 110 may transmit the power amplifier backoff adjustment value in at least one of DCI, a MAC-CE, or an RRC message. The power amplifier backoff adjustment value may indicate an amount of relaxation that can be applied to a default backoff value. For example, the power amplifier backoff adjustment value indicates an amount of an adjustment to apply to a default power amplifier backoff to determine an adjusted power amplifier backoff for an uplink communication. In some aspects, the base station 110 may determine that the UE 120 can use an adjusted power amplifier backoff instead of the default power amplifier backoff based at least in part on the spectrum usage on the neighboring frequency channels and/or a traffic type associated with the uplink communication. In this case, the base station 110 may select the adjusted power amplifier backoff (e.g., an optimal power amplifier backoff) based at least in part on an MCS for the uplink communication and/or a waveform for the uplink communication, and the base station 110 may determine the power amplifier backoff adjustment value to apply to the default power amplifier backoff to achieve the selected power amplifier backoff.

In some aspects, the information, transmitted from the base station 110 to the UE 120, may include information to configure the UE 120 to directly perform sensing of the neighboring frequency channels. For example, the base station 110 may transmit the information to the UE 120 in at least one of DCI, a MAC-CE, or an RRC message. In some aspects, the information may indicate at least one of a power threshold or an energy threshold to be used by the UE 120 for sensing the spectrum usage on the neighboring frequency channels. Additionally, or alternatively, the information may indicate configured timing gaps for the UE 120 to perform sensing of the spectrum usage on the neighboring frequency channels.

As further shown in FIG. 4, and by reference number 415, the UE 120 may determine an adjusted power amplifier backoff based at least in part on the information received from the base station 110. In some aspects, the UE 120 may determine whether to transmit an uplink communication on the carrier frequency using an adjusted power amplifier backoff or a default power amplifier backoff based at least in part on the spectrum usage on the neighboring frequency channels. The default power amplifier backoff may be a power amplifier backoff that results in uplink communications that satisfy a spectrum emission mask. In some aspects, the adjusted power amplifier backoff may be a power amplifier backoff that results in an uplink communication having an improved link performance (e.g., an improved BLER), as compared to an uplink communication transmitted using the default power amplifier backoff.

In some aspects, the UE 120 may determine to transmit the uplink communication using the adjusted power amplifier backoff based at least in part on a determination that the spectrum usage on the neighboring frequency channels does not satisfy a threshold. In this case, the UE 120 may use the adjusted power amplifier backoff to transmit the uplink communication, even if using the adjusted power amplifier backoff results in the uplink communication not satisfying a spectrum emission mask.

In some aspects, in a case in which the UE 120 receives the spectrum usage information from the base station 110, the UE 120 may determine whether the spectrum usage on the neighboring frequency channels satisfies the threshold based at least in part on the spectrum usage information received from the base station 110. In some aspects, the UE 120 may directly perform sensing of the spectrum usage on the neighboring frequency channels. In this case, the UE 120 may receive, from the base station 110, information indicating a power threshold and/or an energy threshold, and the UE 120 may determine whether to transmit the uplink communication using the adjusted power amplifier backoff based at least in part on a comparison of the spectrum usage on the neighboring frequency channels (e.g., power and/or energy measurements on the neighboring frequency channels) with the power threshold and/or the energy threshold. In some aspects, the information, received from the base station 110, may indicate configured timing gaps for sensing the spectrum usage, and the UE 120 may perform the sensing of the spectrum usage on the one or more neighboring frequency channels in the configured timing gaps.

In some aspects, the UE 120 may determine whether to transmit the uplink communication using the default power amplifier backoff or the adjusted power amplifier backoff based at least in part on a traffic type associated with the uplink communication. In this case, the UE 120 may determine to transmit the uplink communication using the adjusted power amplifier backoff based at least in part on the uplink communication being associated with URLLC traffic. In some aspects, the UE 120 may determine whether to transmit the uplink communication using the adjusted power amplifier backoff based at least in part on the spectrum usage on the neighboring frequency channels and based at least in part on the traffic type associated with the uplink traffic. In some aspects, the UE 120 may determine to transmit the uplink communication using the adjusted power amplifier backoff in a case in which the uplink communication is associated with URLLC traffic, even if the spectrum usage on the neighboring frequency channels satisfies a threshold.

In some aspects, based at least in part on a determination to transmit the uplink communication using the adjusted power amplifier backoff, the UE 120 may select the adjusted power amplifier backoff based at least in part on the MCS for the uplink communication, the waveform type for the uplink communication, and/or the input power level (before applying the adjusted power amplifier backoff) for the uplink communication. For example, in some aspects, the UE 120 may select an optimal power amplifier backoff determined for the MCS, waveform, and input power level for the downlink communication.

In some aspects, the UE 120 may select the adjusted power amplifier backoff based at least in part on a mapping from the MCS and/or waveform to the adjusted power amplifier backoff. For example, the UE 120 may select the adjusted power amplifier backoff from a look-up table based at least in part on the MCS and the waveform for the uplink communication. In this case, the mapping/look-up table may be pre-configured for the UE 120 and/or configured for the UE 120 via a communication (e.g., RRC, DCI, and/or MAC-CE) from the base station 110. In some aspects, the adjusted power amplifier backoff values in the mapping/look-up table may be optimal power amplifier backoff values associated with different MCS and waveform combinations. For example, the optimal power amplifier backoff values associated with the different MCS and waveform combinations may be determined using simulations of transmissions using the different MCS and waveform combinations with multiple different power amplifier backoff values.

In some aspects, in a case in which the UE 120 receives information indicating a power amplifier backoff adjustment value from the base station 110, the UE 120 may determine to transmit the uplink communication using the adjusted power amplifier backoff based at least in part on receiving the information including the power amplifier backoff adjustment value from the base station 110. In this case, the UE 120 may determine the adjusted power amplifier backoff by applying the power amplifier backoff adjustment value to a default power amplifier backoff.

In some aspects, based at least in part on determining to transmit the uplink communication using the adjusted power amplifier and/or selecting the adjusted power amplifier backoff, the UE 120 may incorporate the adjusted power amplifier backoff in a power headroom report. For example, the UE 120 may transmit, to the base station 110, a power headroom report that includes a power headroom value determined based at least in part on the adjusted power amplifier backoff.

As further shown in FIG. 4, and by reference number 420, the UE 120 may transmit, to the base station 110, an uplink communication on the carrier frequency using the adjusted power amplifier backoff. In some aspects, the UE 120 may transmit the uplink communication using the adjusted power amplifier backoff based at least in part on a determination to use the adjusted power amplifier backoff. For example, the UE 120 may transmit the uplink communication using the adjusted power amplifier backoff based at least in part on a determination that spectrum usage on the neighboring frequency channels satisfies a threshold and/or based at least in part on a traffic type associated with the uplink communication (e.g., based at least in part on a determination that the uplink communication is associated with URLLC traffic).

As described above in connection with FIG. 4, the base station 110 may transmit, to the UE 120 (e.g., the mobile station), information relating to a power amplifier backoff adjustment. The UE 120 may receive the information relating to the power amplifier backoff adjustment, and the UE 120 may transmit an uplink communication on a frequency channel using an adjusted power amplifier backoff determined based at least in part on the information. In some aspects, the information may relate to spectrum usage on neighboring channels to the frequency channel, and the UE 120 may transmit the uplink communication using the adjusted power amplifier backoff based at least in part on a determination that the spectrum usage on the neighboring channels does not satisfy a threshold. As a result, the UE 120 may adjust a power amplifier backoff for an uplink transmission to improve link performance for the uplink transmission, even in a case in which the uplink transmission using the adjusted power amplifier backoff may not satisfy a spectrum emission mask. This may result in improved link performance, increased coverage, and increased power efficiency (leading to decreased power consumption and increased battery life) for the UE 120.

As indicated above, FIG. 4 is provided as an example. Other examples may differ from what is described with respect to FIG. 4.

Figure 5:
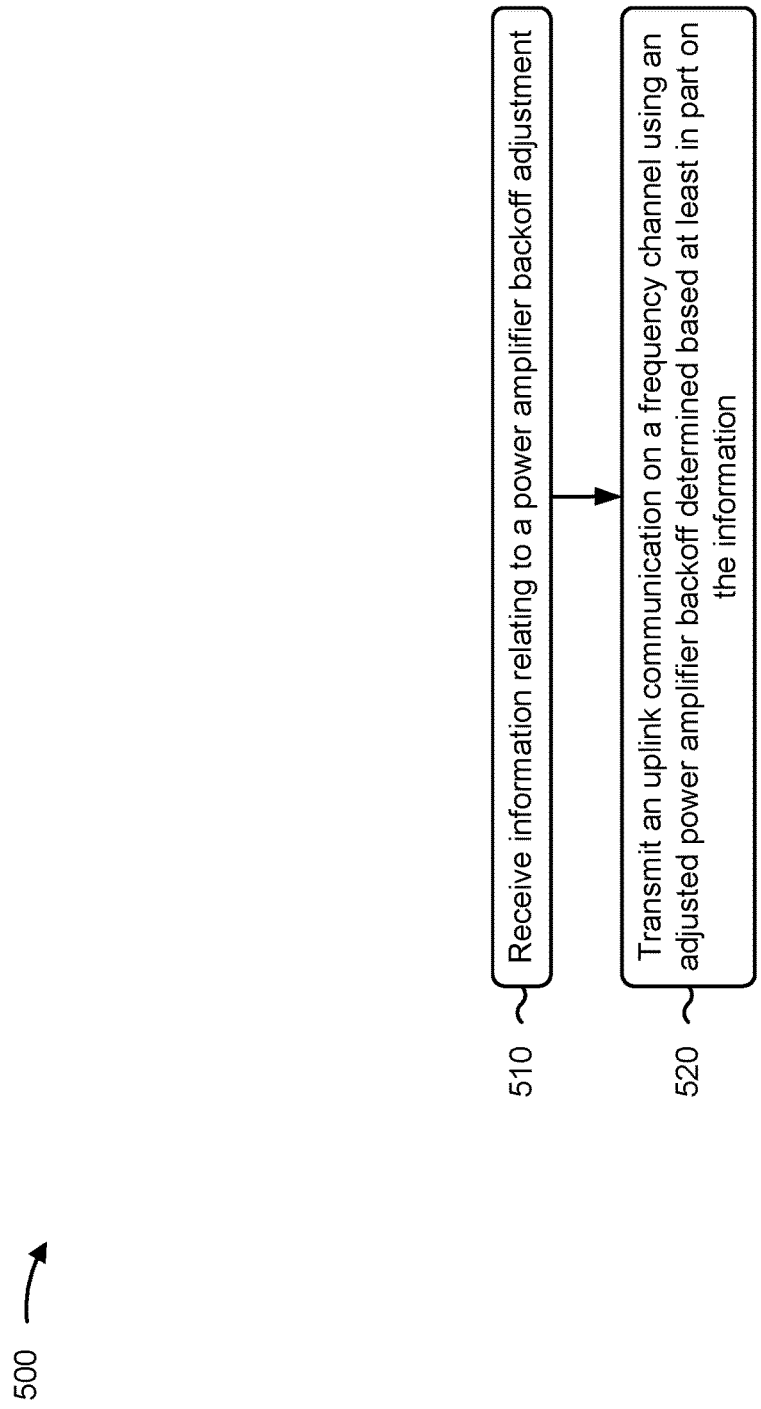
FIGS. 5-6 are diagrams illustrating example processes associated with configurable power amplifier backoff for improved link performance, in accordance with the present disclosure.

FIG. 5 is a diagram illustrating an example process 500 performed, for example, by a mobile station, in accordance with the present disclosure. Example process 500 is an example where the mobile station (e.g., UE 120) performs operations associated with configurable power amplifier backoff for improved link performance.

As shown in FIG. 5, in some aspects, process 500 may include receiving information relating to a power amplifier backoff adjustment (block 510). For example, the mobile station (e.g., using reception component 702, depicted in FIG. 7) may receive information relating to a power amplifier backoff adjustment, as described above.

As further shown in FIG. 5, in some aspects, process 500 may include transmitting an uplink communication on a frequency channel using an adjusted power amplifier backoff determined based at least in part on the information (block 520). For example, the mobile station (e.g., using transmission component 704, depicted in FIG. 7) may transmit an uplink communication on a frequency channel using an adjusted power amplifier backoff determined based at least in part on the information, as described above.

Process 500 may include additional aspects, such as any single aspect or any combination of aspects described below and/or in connection with one or more other processes described elsewhere herein.

In a first aspect, the information includes spectrum usage information that indicates spectrum usage on one or more neighboring frequency channels for the frequency channel.

In a second aspect, alone or in combination with the first aspect, the spectrum usage information is received in at least one of DCI, a MAC-CE, or an RRC message.

In a third aspect, alone or in combination with one or more of the first and second aspects, transmitting the uplink communication on the frequency channel using the adjusted power amplifier backoff includes transmitting the uplink communication on the frequency channel using the adjusted power amplifier backoff based at least in part on a determination that the spectrum usage on the one or more neighboring frequency channels does not satisfy a threshold.

In a fourth aspect, alone or in combination with one or more of the first through third aspects, process 500 includes selecting, by the mobile station, the adjusted power amplifier backoff based at least in part on at least one of a modulation and coding scheme for the uplink communication, an input power level for the uplink communication, or a waveform type for the uplink communication.

In a fifth aspect, alone or in combination with one or more of the first through fourth aspects, process 500 includes transmitting, by the mobile station and to a base station, a power headroom report that comprises a power headroom value determined based at least in part on the adjusted power amplifier backoff.

In a sixth aspect, alone or in combination with one or more of the first through fifth aspects, the information indicates a power amplifier backoff adjustment value, and the adjusted power amplifier backoff is determined by applying the power amplifier backoff adjustment value to a default power amplifier backoff.

In a seventh aspect, alone or in combination with one or more of the first through sixth aspects, process 500 includes sensing, by the mobile station, spectrum usage on one or more neighboring frequency channels for the frequency channel, and the information indicates at least one of a power threshold or an energy threshold, and transmitting the uplink communication on the frequency channel using the adjusted power amplifier backoff includes transmitting the uplink communication on the frequency channel using the adjusted power amplifier backoff based at least in part on a comparison of the spectrum usage on the one or more neighboring frequency channels and the at least one of the power threshold or the energy threshold.

In an eighth aspect, alone or in combination with one or more of the first through seventh aspects, the information further indicates configured timing gaps for the mobile station to perform sensing of the spectrum usage on the one or more neighboring frequency channels, and sensing the spectrum usage on the one or more frequency channels includes sensing the spectrum usage on the one or more neighboring frequency channels in the configured timing gaps.

In a ninth aspect, alone or in combination with one or more of the first through eighth aspects, transmitting the uplink communication on the frequency channel using the adjusted power amplifier backoff includes transmitting the uplink communication on the frequency channel using the adjusted power amplifier backoff based at least in part on a traffic type associated with the uplink communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
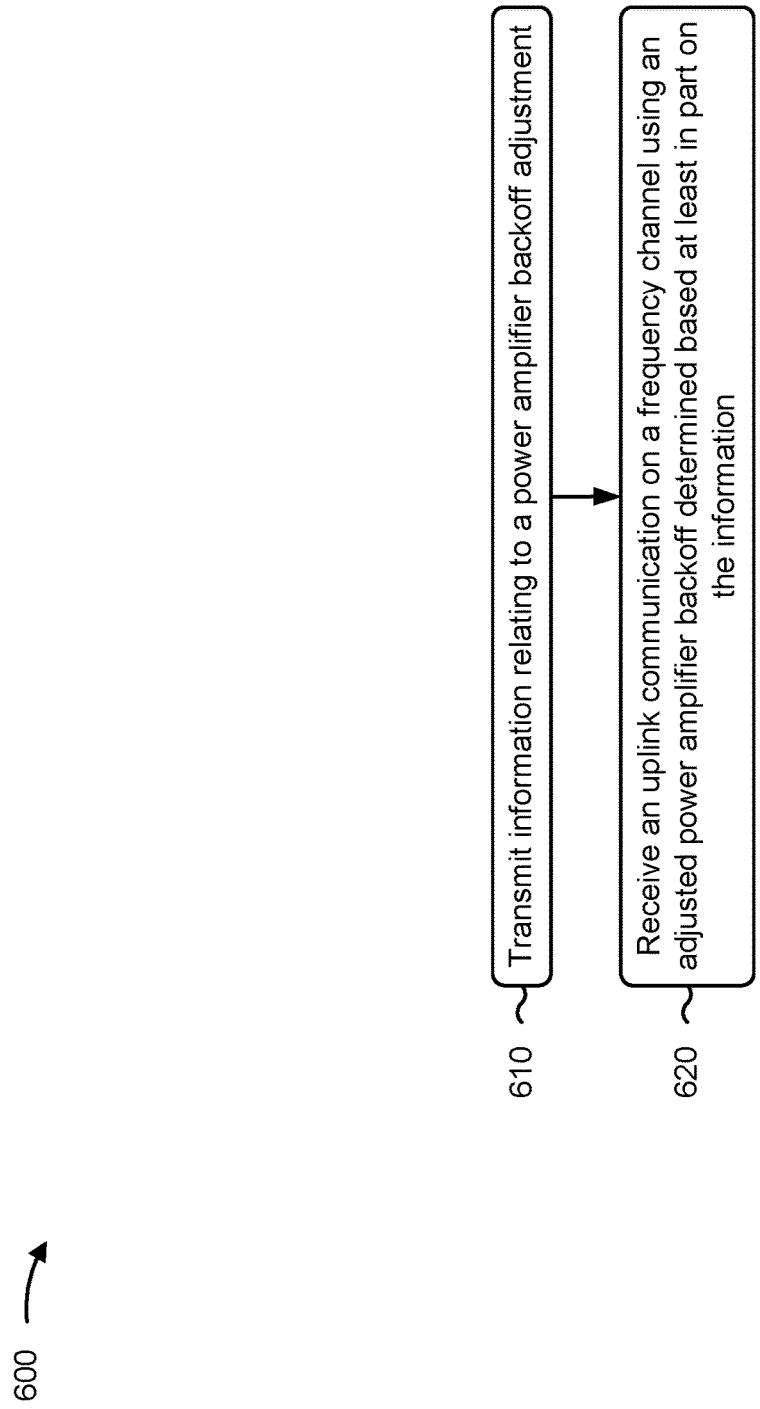

FIG. 6 is a diagram illustrating an example process 600 performed, for example, by a base station, in accordance with the present disclosure. Example process 600 is an example where the base station (e.g., base station 110) performs operations associated with configurable power amplifier backoff for improved link performance.

As shown in FIG. 6, in some aspects, process 600 may include transmitting, to a mobile station, information relating to a power amplifier backoff adjustment (block 610). For example, the base station (e.g., using transmission component 804, depicted in FIG. 8) may transmit, to a mobile station, information relating to a power amplifier backoff adjustment, as described above.

As further shown in FIG. 6, in some aspects, process 600 may include receiving, from the mobile station, an uplink communication on a frequency channel using an adjusted power amplifier backoff determined based at least in part on the information (block 620). For example, the base station (e.g., using reception component 802, depicted in FIG. 8) may receive, from the mobile station, an uplink communication on a frequency channel using an adjusted power amplifier backoff determined based at least in part on the information, as described above.

Process 600 may include additional aspects, such as any single aspect or any combination of aspects described below and/or in connection with one or more other processes described elsewhere herein.

In a first aspect, the information includes spectrum usage information that indicates spectrum usage on one or more neighboring frequency channels for the frequency channel.

In a second aspect, alone or in combination with the first aspect, the spectrum usage information is transmitted in at least one of DCI, a MAC-CE, or an RRC message.

In a third aspect, alone or in combination with one or more of the first and second aspects, receiving the uplink communication on the frequency channel using the adjusted power amplifier backoff includes receiving the uplink communication on the frequency channel using the adjusted power amplifier backoff based at least in part on a determination that the spectrum usage on the one or more neighboring frequency channels does not satisfy a threshold.

In a fourth aspect, alone or in combination with one or more of the first through third aspects, process 600 includes selecting the adjusted power amplifier backoff based at least in part on at least one of a modulation and coding scheme for the uplink communication or a waveform type for the uplink communication, and the information indicates a power amplifier backoff adjustment value determined based at least in part the adjusted power amplifier backoff.

In a fifth aspect, alone or in combination with one or more of the first through fourth aspects, process 600 includes receiving a power headroom report that includes a power headroom value determined based at least in part on the adjusted power amplifier backoff.

In a sixth aspect, alone or in combination with one or more of the first through fifth aspects, the information indicates at least one of a power threshold or an energy threshold to be used by the mobile station to perform sensing of spectrum usage on one or more neighboring frequency channels.

In a seventh aspect, alone or in combination with one or more of the first through sixth aspects, the information indicates configured timing gaps for the mobile station to perform sensing of spectrum usage on one or more neighboring frequency channels.

In an eighth aspect, alone or in combination with one or more of the first through seventh aspects, receiving the uplink communication on the frequency channel using the adjusted power amplifier backoff includes receiving the uplink communication on the frequency channel using the adjusted power amplifier backoff based at least in part on a traffic type associated with the uplink communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
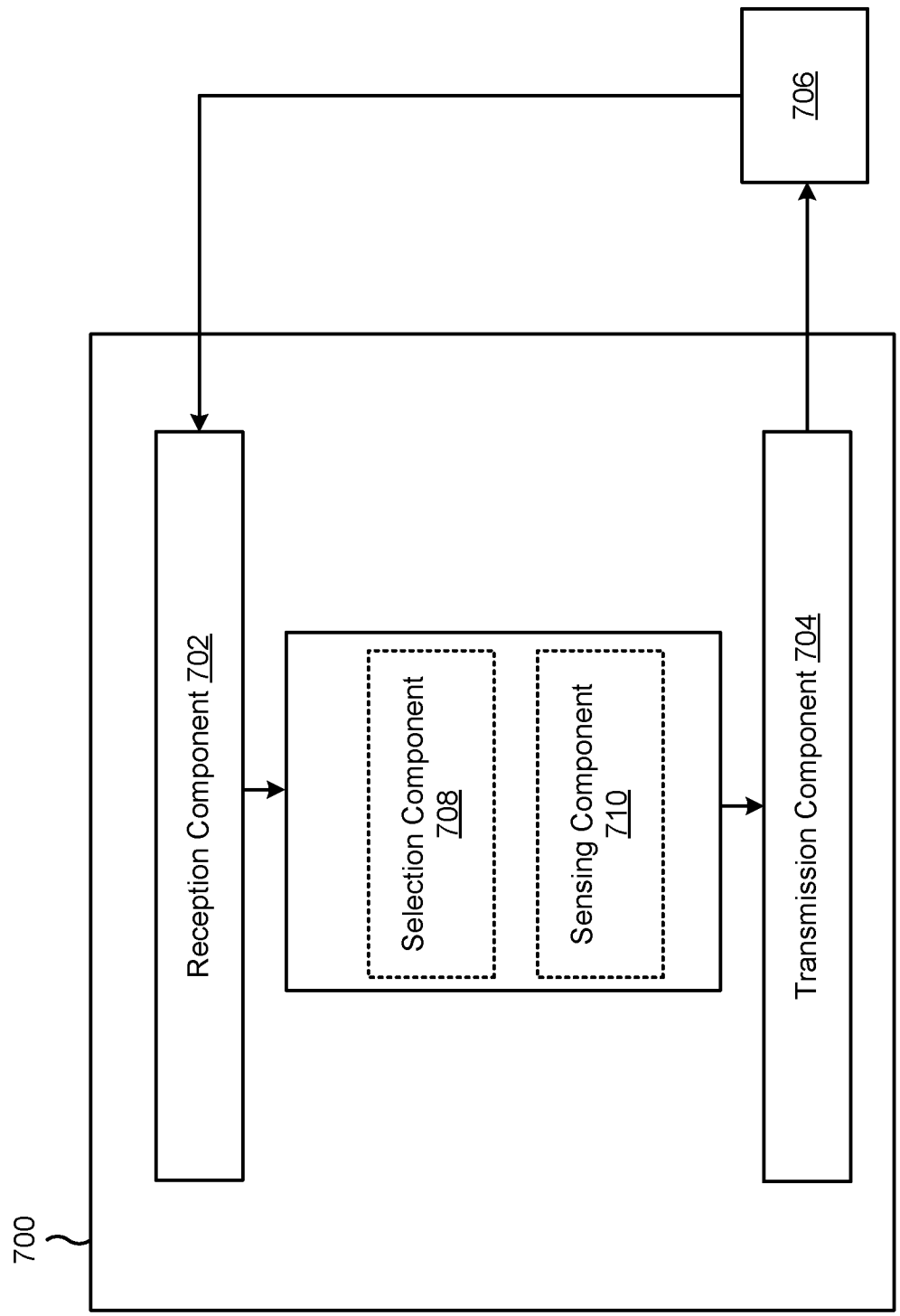
FIGS. 7-8 are block diagrams of example apparatuses for wireless communication, in accordance with the present disclosure.

FIG. 7 is a block diagram of an example apparatus 700 for wireless communication. The apparatus 700 may be a mobile station (e.g., a UE), or a mobile station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a selection component 708 or a sensing component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive information relating to a power amplifier backoff adjustment. The transmission component 704 may transmit an uplink communication on a frequency channel using an adjusted power amplifier backoff determined based at least in part on the information.

The selection component 708 may select the adjusted power amplifier backoff based at least in part on at least one of a modulation and coding scheme for the uplink communication, an input power level for the uplink communication, or a waveform type for the uplink communication.

The transmission component 704 may transmit, to a base station, a power headroom report that comprises a power headroom value determined based at least in part on the adjusted power amplifier backoff.

The sensing component 710 may sense spectrum usage on one or more neighboring frequency channels for the frequency channel.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
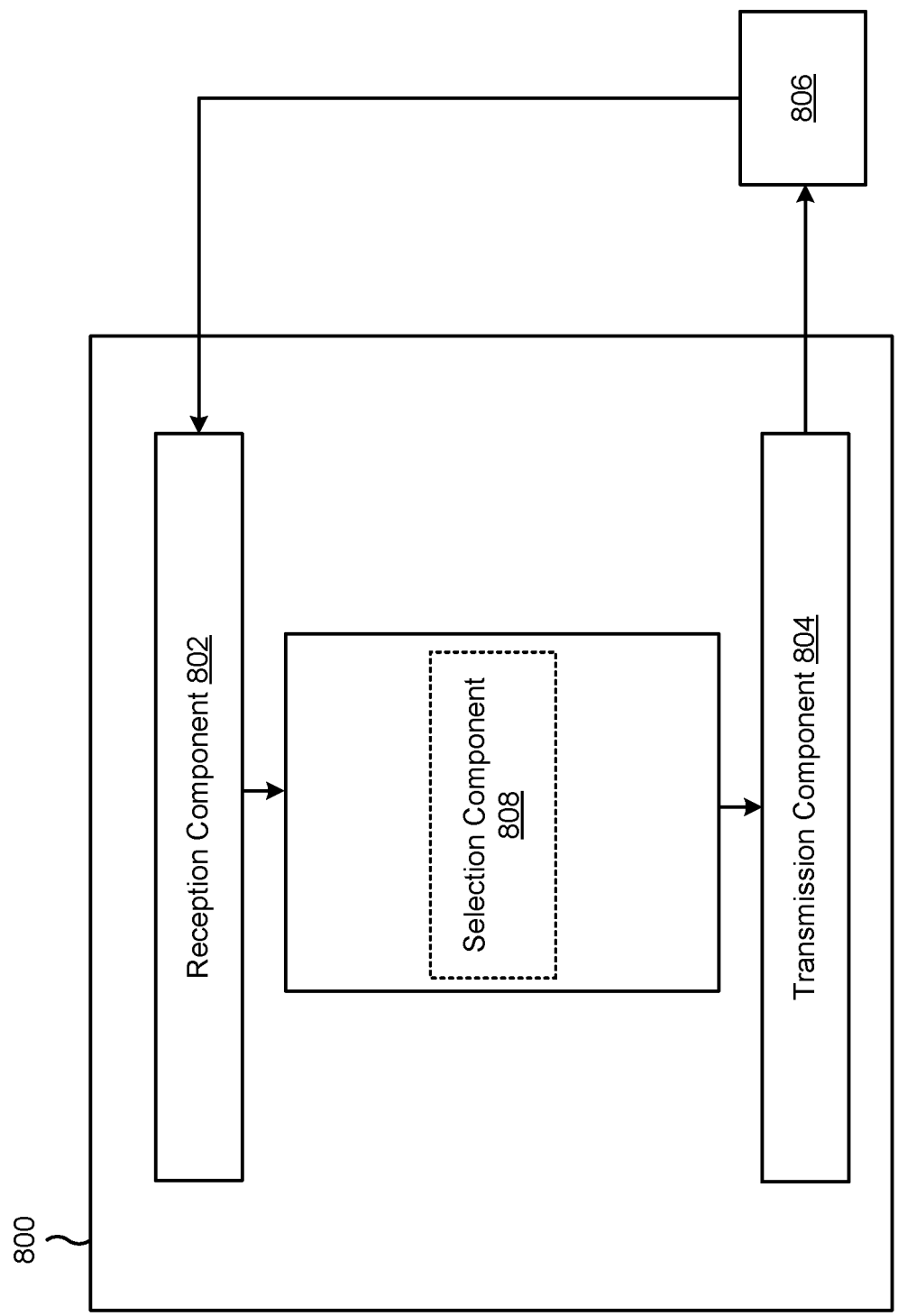

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a selection component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a mobile station, information relating to a power amplifier backoff adjustment. The reception component 802 may receive, from the mobile station, an uplink communication on a frequency channel using an adjusted power amplifier backoff determined based at least in part on the information.

The selection component 808 may select the adjusted power amplifier backoff based at least in part on at least one of a modulation and coding scheme for the uplink communication or a waveform type for the uplink communication.

The reception component 802 may receive, from the mobile station, a power headroom report that comprises a power headroom value determined based at least in part on the adjusted power amplifier backoff.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a mobile station, comprising: receiving, by the mobile station, information relating to a power amplifier backoff adjustment; and transmitting, by the mobile station, an uplink communication on a frequency channel using an adjusted power amplifier backoff determined based at least in part on the information.

Aspect 2: The method of Aspect 1, wherein the information comprises spectrum usage information that indicates spectrum usage on one or more neighboring frequency channels for the frequency channel.

Aspect 3: The method of Aspect 2, wherein the spectrum usage information is received in at least one of downlink control information, a medium access control (MAC) control element, or a radio resource control message.

Aspect 4: The method of any of Aspects 2-3, wherein transmitting the uplink communication on the frequency channel using the adjusted power amplifier backoff comprises: transmitting, by the mobile station, the uplink communication on the frequency channel using the adjusted power amplifier backoff based at least in part on a determination that the spectrum usage on the one or more neighboring frequency channels does not satisfy a threshold.

Aspect 5: The method of any of Aspects 1-4, further comprising: selecting, by the mobile station, the adjusted power amplifier backoff based at least in part on at least one of a modulation and coding scheme for the uplink communication, an input power level for the uplink communication, or a waveform type for the uplink communication.

Aspect 6: The method of any of Aspects 1-5, further comprising: transmitting, by the mobile station and to a base station, a power headroom report that comprises a power headroom value determined based at least in part on the adjusted power amplifier backoff.

Aspect 7: The method of any of Aspects 1 or 6, wherein the information indicates a power amplifier backoff adjustment value, and the adjusted power amplifier backoff is determined by applying the power amplifier backoff adjustment value to a default power amplifier backoff.

Aspect 8: The method of any of Aspects 1, 5, or 6, further comprising: sensing, by the mobile station, spectrum usage on one or more neighboring frequency channels for the frequency channel, wherein the information indicates at least one of a power threshold or an energy threshold, and transmitting the uplink communication on the frequency channel using the adjusted power amplifier backoff comprises: transmitting, by the mobile station, the uplink communication on the frequency channel using the adjusted power amplifier backoff based at least in part on a comparison of the spectrum usage on the one or more neighboring frequency channels and the at least one of the power threshold or the energy threshold.

Aspect 9: The method of Aspect 8, wherein the information further indicates configured timing gaps for the mobile station to perform sensing of the spectrum usage on the one or more neighboring frequency channels, and sensing the spectrum usage on the one or more frequency channels comprises: sensing, by the mobile station, the spectrum usage on the one or more neighboring frequency channels in the configured timing gaps.

Aspect 10: The method of any of Aspects 1-9, wherein transmitting the uplink communication on the frequency channel using the adjusted power amplifier backoff comprises: transmitting, by the mobile station, the uplink communication on the frequency channel using the adjusted power amplifier backoff based at least in part on a traffic type associated with the uplink communication.

Aspect 11: A method of wireless communication performed by a base station, comprising: transmitting, by the base station and to a mobile station, information relating to a power amplifier backoff adjustment; and receiving, by the base station and from the mobile station, an uplink communication on a frequency channel using an adjusted power amplifier backoff determined based at least in part on the information.

Aspect 12: The method of Aspect 11, wherein the information comprises spectrum usage information that indicates spectrum usage on one or more neighboring frequency channels for the frequency channel.

Aspect 13: The method of Aspect 12, wherein the spectrum usage information is received in at least one of downlink control information, a medium access control (MAC) control element, or a radio resource control message.

Aspect 14: The method of any of Aspects 12-13, wherein receiving the uplink communication on the frequency channel using the adjusted power amplifier backoff comprises: receiving, by the base station and from the mobile station, the uplink communication on the frequency channel using the adjusted power amplifier backoff based at least in part on a determination, by the mobile station, that the spectrum usage on the one or more neighboring frequency channels does not satisfy a threshold.

Aspect 15: The method of Aspect 11, further comprising: selecting, by the base station, the adjusted power amplifier backoff based at least in part on at least one of a modulation and coding scheme for the uplink communication or a waveform type for the uplink communication, wherein the information indicates a power amplifier backoff adjustment value determined based at least in part the adjusted power amplifier backoff.

Aspect 16: The method of any of Aspects 11-15, further comprising: receiving, by the base station and from the mobile station, a power headroom report that comprises a power headroom value determined based at least in part on the adjusted power amplifier backoff.

Aspect 17: The method of any of Aspects 11 or 16, wherein the information indicates at least one of a power threshold or an energy threshold to be used by the mobile station to perform sensing of spectrum usage on one or more neighboring frequency channels.

Aspect 18: The method of any of Aspects 11, 16, or 17, wherein the information indicates configured timing gaps for the mobile station to perform sensing of spectrum usage on one or more neighboring frequency channels.

Aspect 19: The method of any of Aspects 11-18, wherein receiving the uplink communication on the frequency channel using the adjusted power amplifier backoff comprises: receiving, by base station and from the mobile station, the uplink communication on the frequency channel using the adjusted power amplifier backoff based at least in part on a traffic type associated with the uplink communication.

Aspect 20: An apparatus for wireless communication at a device, comprising a processor; memory coupled with the processor; and instructions stored in the memory and executable by the processor to cause the apparatus to perform the method of one or more of Aspects 1-10.

Aspect 21: An apparatus for wireless communication at a device, comprising a processor; memory coupled with the processor; and instructions stored in the memory and executable by the processor to cause the apparatus to perform the method of one or more of Aspects 11-19.

Aspect 22: A device for wireless communication, comprising a memory and one or more processors coupled to the memory, the one or more processors configured to perform the method of one or more of Aspects 1-10.

Aspect 23: A device for wireless communication, comprising a memory and one or more processors coupled to the memory, the one or more processors configured to perform the method of one or more of Aspects 11-19.

Aspect 24: An apparatus for wireless communication, comprising at least one means for performing the method of one or more of Aspects 1-10.

Aspect 25: An apparatus for wireless communication, comprising at least one means for performing the method of one or more of Aspects 11-19.

Aspect 26: A non-transitory computer-readable medium storing code for wireless communication, the code comprising instructions executable by a processor to perform the method of one or more of Aspects 1-10.

Aspect 27: A non-transitory computer-readable medium storing code for wireless communication, the code comprising instructions executable by a processor to perform the method of one or more of Aspects 11-19.

Aspect 28: A non-transitory computer-readable medium storing a set of instructions for wireless communication, the set of instructions comprising one or more instructions that, when executed by one or more processors of a device, cause the device to perform the method of one or more of Aspects 1-10.

Aspect 29: A non-transitory computer-readable medium storing a set of instructions for wireless communication, the set of instructions comprising one or more instructions that, when executed by one or more processors of a device, cause the device to perform the method of one or more of Aspects 11-19.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
   a memory; and
   one or more processors, coupled to the memory, that, based at least in part on information stored in the memory, are configured to:
      receive information indicating a power amplifier backoff adjustment value; and
      transmit an uplink communication on a frequency channel using an adjusted power amplifier backoff determined based at least in part on the information, the adjusted power amplifier backoff being determined by applying the power amplifier backoff adjustment value to a default power amplifier backoff.

2. The mobile station of claim 1, wherein the information comprises spectrum usage information that indicates spectrum usage on one or more neighboring frequency channels for the frequency channel.

3. The mobile station of claim 2, wherein the one or more processors are configured to receive the spectrum usage information in at least one of downlink control information, a medium access control (MAC) control element, or a radio resource control message.

4. The mobile station of claim 2, wherein the one or more processors, to transmit the uplink communication on the frequency channel using the adjusted power amplifier backoff, are configured to:
   transmit the uplink communication on the frequency channel using the adjusted power amplifier backoff based at least in part on a determination that the spectrum usage on the one or more neighboring frequency channels does not satisfy a threshold.

5. The mobile station of claim 1, wherein the one or more processors are further configured to:
   transmit a power headroom report that comprises a power headroom value determined based at least in part on the adjusted power amplifier backoff.

6. The mobile station of claim 1, wherein the one or more processors are further configured to:
   sense spectrum usage on one or more neighboring frequency channels for the frequency channel,
   wherein the information indicates at least one of a power threshold or an energy threshold, and the one or more processors, to transmit the uplink communication on the frequency channel using the adjusted power amplifier backoff, are configured to:
   transmit the uplink communication on the frequency channel using the adjusted power amplifier backoff based at least in part on a comparison of the spectrum usage on the one or more neighboring frequency channels and the at least one of the power threshold or the energy threshold.

7. The mobile station of claim 6, wherein the information further indicates configured timing gaps for the mobile station to perform sensing of the spectrum usage on the one or more neighboring frequency channels, and the one or more processors, to sense the spectrum usage on the one or more frequency channels, are configured to:
   sense the spectrum usage on the one or more neighboring frequency channels in the configured timing gaps.

8. The mobile station of claim 1, wherein the adjusted power amplifier backoff is selected further based at least in part on at least one of a modulation and coding scheme for the uplink communication, an input power level for the uplink communication, or a waveform type for the uplink communication.

9. A base station for wireless communication, comprising:
   a memory; and
   one or more processors, coupled to the memory, that, based at least in part on information stored in the memory, are configured to:
      transmit, to a mobile station, information relating to a power amplifier backoff adjustment, the information relating to the power amplifier backoff adjustment indicating a power amplifier backoff adjustment value determined based at least in part on the adjusted power amplifier backoff and at least one of a power threshold or an energy threshold to be used by the mobile station to perform sensing of spectrum usage on one or more neighboring frequency channels; and receive, from the mobile station, an uplink communication on a frequency channel using an adjusted power amplifier backoff determined based at least in part on the information.

10. The base station of claim 9, wherein the information comprises spectrum usage information that indicates the spectrum usage on the one or more neighboring frequency channels.

11. The base station of claim 10, wherein the one or more processors are configured to transmit the spectrum usage information in at least one of downlink control information, a medium access control (MAC) control element, or a radio resource control message.

12. The base station of claim 10, wherein the one or more processors, to receive the uplink communication on the frequency channel using the adjusted power amplifier backoff, are configured to:
receive, from the mobile station, the uplink communication on the frequency channel using the adjusted power amplifier backoff based at least in part on a determination, by the mobile station, that the spectrum usage on the one or more neighboring frequency channels does not satisfy the energy threshold.

13. The base station of claim 9, wherein the one or more processors are further configured to:
receive, from the mobile station, a power headroom report that comprises a power headroom value determined based at least in part on the adjusted power amplifier backoff.

14. The base station of claim 9, wherein the information indicates the power threshold and the energy threshold to be used by the mobile station to perform the sensing of the spectrum usage on the one or more neighboring frequency channels.

15. The base station of claim 9, wherein the information indicates configured timing gaps for the mobile station to perform the sensing of the spectrum usage on the one or more neighboring frequency channels.

16. The base station of claim 9, wherein the one or more processors, to receive the uplink communication on the frequency channel using the adjusted power amplifier backoff, are configured to:
receive, from the mobile station, the uplink communication on the frequency channel using the adjusted power amplifier backoff based at least in part on a traffic type associated with the uplink communication.

17. The base station of claim 9, wherein the one or more processors, to receive the uplink communication on the frequency channel using the adjusted power amplifier backoff, are configured to:
receive, from the mobile station, the uplink communication on the frequency channel using the adjusted power amplifier backoff further based at least in part on at least one of a modulation and coding scheme for the uplink communication, an input power level for the uplink communication, or a waveform type for the uplink communication.

18. A method of wireless communication performed by a mobile station, comprising:
receiving, by the mobile station, information indicating a power amplifier backoff adjustment value; and
transmitting, by the mobile station, an uplink communication on a frequency channel using an adjusted power amplifier backoff determined based at least in part on the information, the adjusted power amplifier backoff being determined by applying the power amplifier backoff adjustment value to a default power amplifier backoff.

19. The method of claim 18, wherein the information comprises spectrum usage information that indicates spectrum usage on one or more neighboring frequency channels for the frequency channel.

20. The method of claim 19, wherein transmitting the uplink communication on the frequency channel using the adjusted power amplifier backoff comprises:
transmitting, by the mobile station, the uplink communication on the frequency channel using the adjusted power amplifier backoff based at least in part on a determination that the spectrum usage on the one or more neighboring frequency channels does not satisfy a threshold.

21. The method of claim 18, further comprising:
sensing, by the mobile station, spectrum usage on one or more neighboring frequency channels for the frequency channel,
wherein the information indicates at least one of a power threshold or an energy threshold, and transmitting the uplink communication on the frequency channel using the adjusted power amplifier backoff comprises:
transmitting, by the mobile station, the uplink communication on the frequency channel using the adjusted power amplifier backoff based at least in part on a comparison of the spectrum usage on the one or more neighboring frequency channels and the at least one of the power threshold or the energy threshold.

22. The method of claim 21, wherein the information further indicates configured timing gaps for the mobile station to perform sensing of the spectrum usage on the one or more neighboring frequency channels, and sensing the spectrum usage on the one or more frequency channels comprises:
sensing, by the mobile station, the spectrum usage on the one or more neighboring frequency channels in the configured timing gaps.

23. A method of wireless communication performed by a base station, comprising:
transmitting, by the base station and to a mobile station, information relating to a power amplifier backoff adjustment, the information relating to the power amplifier backoff adjustment indicating a power amplifier backoff adjustment value determined based at least in part on the adjusted power amplifier backoff and at least one of a power threshold or an energy threshold to be used by the mobile station to perform sensing of spectrum usage on one or more neighboring frequency channels; and
receiving, by the base station and from the mobile station, an uplink communication on a frequency channel using an adjusted power amplifier backoff determined based at least in part on the information.

24. The method of claim 23, wherein the information comprises spectrum usage information that indicates the spectrum usage on the one or more neighboring frequency channels.

25. The method of claim 24, further comprising:
transmitting the spectrum usage information in at least one of downlink control information, a medium access control (MAC) control element, or a radio resource control message.

26. The method of claim 24, wherein receiving the uplink communication on the frequency channel using the adjusted power amplifier backoff comprises:

receiving, from the mobile station, the uplink communication on the frequency channel using the adjusted power amplifier backoff based at least in part on a determination, by the mobile station, that the spectrum usage on the one or more neighboring frequency channels does not satisfy the energy threshold.

27. The method of claim 23, further comprising:
receiving, from the mobile station, a power headroom report that comprises a power headroom value determined based at least in part on the adjusted power amplifier backoff.

28. The method of claim 23, wherein the information relating to the power amplifier backoff adjustment indicates at least one of a power threshold or an energy threshold to be used by the mobile station to perform sensing of spectrum usage on one or more neighboring frequency channels.

29. The method of claim 23, wherein the information indicates configured timing gaps for the mobile station to perform the sensing of the spectrum usage on the one or more neighboring channels.

30. The method of claim 23, wherein receiving the uplink communication on the frequency channel using the adjusted power amplifier backoff comprises:
receiving, from the mobile station, the uplink communication on the frequency channel using the adjusted power amplifier backoff based at least in part on a traffic type associated with the uplink communication.

* * * * *